(12) United States Patent
Lee et al.

(10) Patent No.: US 12,127,166 B2
(45) Date of Patent: Oct. 22, 2024

(54) METHOD AND APPARATUS FOR COORDINATING AND ALLOCATING SIDELINK RESOURCE

(71) Applicant: ELECTRONICS AND TELECOMMUNICATIONS RESEARCH INSTITUTE, Daejeon (KR)

(72) Inventors: Jung Hoon Lee, Daejeon (KR); Cheul Soon Kim, Daejeon (KR); Sung Hyun Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 179 days.

(21) Appl. No.: 17/394,077

(22) Filed: Aug. 4, 2021

(65) Prior Publication Data

US 2022/0046594 A1 Feb. 10, 2022

(30) Foreign Application Priority Data

| | | |
|---|---|---|
| Aug. 7, 2020 | (KR) | 10-2020-0099489 |
| Oct. 19, 2020 | (KR) | 10-2020-0135558 |
| Jan. 18, 2021 | (KR) | 10-2021-0007072 |
| May 11, 2021 | (KR) | 10-2021-0060925 |
| Jul. 19, 2021 | (KR) | 10-2021-0094344 |

(51) Int. Cl.
*H04W 72/02* (2009.01)
*H04W 72/04* (2023.01)
*H04W 72/0453* (2023.01)
*H04W 72/56* (2023.01)

(52) U.S. Cl.
CPC ....... *H04W 72/02* (2013.01); *H04W 72/0453* (2013.01); *H04W 72/56* (2023.01)

(58) Field of Classification Search
None
See application file for complete search history.

(56) References Cited

U.S. PATENT DOCUMENTS

| | | | |
|---|---|---|---|
| 11,540,097 B2 * | 12/2022 | Park | H04W 72/044 |
| 2020/0106500 A1 | 4/2020 | Noh et al. | |
| 2020/0229171 A1 | 7/2020 | Khoryaev et al. | |
| 2020/0275425 A1 | 8/2020 | Cao et al. | |
| 2020/0305127 A1 | 9/2020 | Huang et al. | |
| 2020/0328865 A1 | 10/2020 | Choi et al. | |
| 2020/0344574 A1 | 10/2020 | Park et al. | |
| 2021/0400634 A1 * | 12/2021 | Lee | H04W 92/18 |
| 2022/0255680 A1 * | 8/2022 | Moon | H04W 72/21 |
| 2022/0361069 A1 * | 11/2022 | Zhang | H04W 36/0016 |
| 2022/0361227 A1 * | 11/2022 | Lee | H04L 1/08 |

(Continued)

FOREIGN PATENT DOCUMENTS

| | | |
|---|---|---|
| WO | 2018206992 A1 | 11/2018 |
| WO | 2020060105 A2 | 3/2020 |

*Primary Examiner* — Sai Aung
(74) *Attorney, Agent, or Firm* — Rabin & Berdo, P.C.

(57) ABSTRACT

An operation method of a transmitting terminal in a communication system may comprise: receiving resource coordination information; selecting a resource for sidelink communication based on the resource coordination information; and transmitting data to one or more receiving terminals by using the selected resource, wherein the resource coordination information is one of information on a preferred resource and information on a non-preferred resource for the sidelink communication.

16 Claims, 13 Drawing Sheets

(56) References Cited

U.S. PATENT DOCUMENTS

| | | | | |
|---|---|---|---|---|
| 2022/0368504 A1* | 11/2022 | Zhao | ................... | H04L 1/1854 |
| 2022/0400482 A1* | 12/2022 | Zhao | ................... | H04L 5/0091 |
| 2023/0012983 A1* | 1/2023 | Zhang | ................. | H04W 72/25 |
| 2023/0072379 A1* | 3/2023 | Cheng | ............... | H04W 12/0431 |
| 2023/0103205 A1* | 3/2023 | Guo | ..................... | H04L 5/0035 |
| | | | | 370/329 |
| 2023/0254817 A1* | 8/2023 | Zhao | ................... | H04W 72/25 |
| | | | | 370/329 |
| 2023/0284245 A1* | 9/2023 | Zhao | ................... | H04W 72/02 |
| | | | | 370/236 |

\* cited by examiner

RMSI CORESET mapping pattern #3

METHOD AND APPARATUS FOR COORDINATING AND ALLOCATING SIDELINK RESOURCE

CROSS-REFERENCE TO RELATED APPLICATIONS

This application claims priority to Korean Patent Applications No. 10-2020-0099489 filed on Aug. 7, 2020, No. 10-2020-0135558 filed on Oct. 19, 2020, No. 10-2021-0007072 filed on Jan. 18, 2021, No. 10-2021-0060925 filed on May 11, 2021, and No. 10-2021-0094344 filed on Jul. 19, 2021 with the Korean Intellectual Property Office (KIPO), the entire contents of which are hereby incorporated by reference.

BACKGROUND

1. Technical Field

The present disclosure relates to a sidelink communication technique in a communication system, and more specifically, to a technique for coordinating and allocating sidelink resources.

2. Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

Sidelink communication may be performed in the NR system. The sidelink communication may be performed based on mode 1 or mode 2. When the mode 1 is used, the sidelink communication may be performed using a resource scheduled by a base station. When the mode 2 is used, the sidelink communication may be performed using a resource selected by a terminal. In this case, if the same resource is selected by a plurality of terminals, the sidelink communication may collide. A method is needed to solve these problems.

SUMMARY

Accordingly, exemplary embodiments of the present disclosure are directed to providing methods and apparatuses for coordinating and allocating sidelink resources.

According to a first exemplary embodiment of the present disclosure, an operation method of a transmitting terminal in a communication system may comprise: receiving resource coordination information; selecting a resource for sidelink communication based on the resource coordination information; and transmitting data to one or more receiving terminals by using the selected resource, wherein the resource coordination information is one of information on a preferred resource and information on a non-preferred resource for the sidelink communication.

The operation method may further comprise receiving an indicator indicating that the resource coordination information is the information on a preferred resource or the information on a non-preferred resource.

When the resource coordination information is the information on a preferred resource, the resource for sidelink communication may be selected within a first resource region indicated by the resource coordination information.

When the resource coordination information is the information on a non-preferred resource, the resource for sidelink communication may be selected within resources other than a first resource region indicated by the resource coordination information.

The selecting of the resource for sidelink communication may comprise: performing a resource sensing operation; and when an overlapped resource between a first resource region indicated by the resource coordination information and a second resource region according to a result of the resource sensing operation exists, selecting the overlapped resource for sidelink communication within the first resource region or the second resource region.

The selecting of the resource for sidelink communication may comprise: when the first resource region is different from the second resource region and a priority of the resource coordination information is higher than a priority of the result of the resource sensing operation, selecting preferentially the resource for sidelink communication within the first resource region.

The selecting of the resource for sidelink communication may comprise: when the first resource region is different from the second resource region and a priority of the resource coordination information is lower than a priority of the result of the resource sensing operation, selecting preferentially the resource for sidelink communication within the second resource region.

The operation method may further comprise receiving a message including at least one of information on a priority of the resource coordination information and information on a priority of the result of the resource sensing operation.

The maximum number of resource regions indicated by the resource coordination information may be three or more.

The size of a subchannel indicated by the resource coordination information may be configured to be different from the size of a subchannel through which the data is transmitted and received.

A resource pool indicated by the resource coordination information may be independently configured, and the resource coordination information may be received in the resource pool.

The resource coordination information may have a high priority so that a transmission resource of the resource coordination information may not be pre-empted.

The operation method may further comprise periodically receiving updated resource coordination information.

The operation method may further comprise receiving updated resource coordination information according to an occurrence of an event or an update request.

According to a second exemplary embodiment of the present disclosure, a transmitting terminal may comprise a processor; a memory electronically communicating with the processor; and instructions stored in the memory. In addition, when executed by the processor, the instructions may cause the transmitting terminal to: receive resource coordination information; select a resource for sidelink communication based on the resource coordination information; and transmit data to one or more receiving terminals by using the selected resource, wherein the resource coordination information is one of information on a preferred resource and information on a non-preferred resource for the sidelink communication.

The instructions may further cause the transmitting terminal to receive an indicator indicating that the resource coordination information is the information on a preferred resource or the information on a non-preferred resource, wherein when the resource coordination information is the information on a preferred resource, the resource for sidelink communication may be selected within a first resource region indicated by the resource coordination information, and when the resource coordination information is the information on a non-preferred resource, the resource for sidelink communication may be selected within resources other than a first resource region indicated by the resource coordination information.

In the selecting of the resource for sidelink communication, the instructions may further cause the transmitting terminal to: perform a resource sensing operation; and when an overlapped resource between a first resource region indicated by the resource coordination information and a second resource region according to a result of the resource sensing operation exists, select the overlapped resource for sidelink communication within the first resource region or the second resource region.

In the selecting of the resource for sidelink communication, the instructions may further cause the transmitting terminal to: when the first resource region is different from the second resource region and a priority of the resource coordination information is higher than a priority of the result of the resource sensing operation, select preferentially the resource for sidelink communication within the first resource region.

In the selecting of the resource for sidelink communication, the instructions may further cause the transmitting terminal to: when the first resource region is different from the second resource region and a priority of the resource coordination information is lower than a priority of the result of the resource sensing operation, select preferentially the resource for sidelink communication within the second resource region.

The maximum number of resource regions indicated by the resource coordination information may be three or more, and the size of a subchannel indicated by the resource coordination information may be configured to be different from the size of a subchannel through which the data is transmitted and received.

According to the exemplary embodiments, even when sidelink communication is performed based on the mode 2, sidelink resources may be coordinated. That is, in order to prevent resource collisions between terminals, sidelink resources may be coordinated. The sidelink communication may be performed based on the coordinated resources, and thus, the resource collisions between terminals may be reduced. That is, the performance of the communication system may be improved. In addition, since a resource sensing operation and/or resource selection operation may be performed within restricted resources (e.g., coordinated resources), energy efficiency may be improved.

DETAILED DESCRIPTION OF THE EMBODIMENTS

Figure 1:
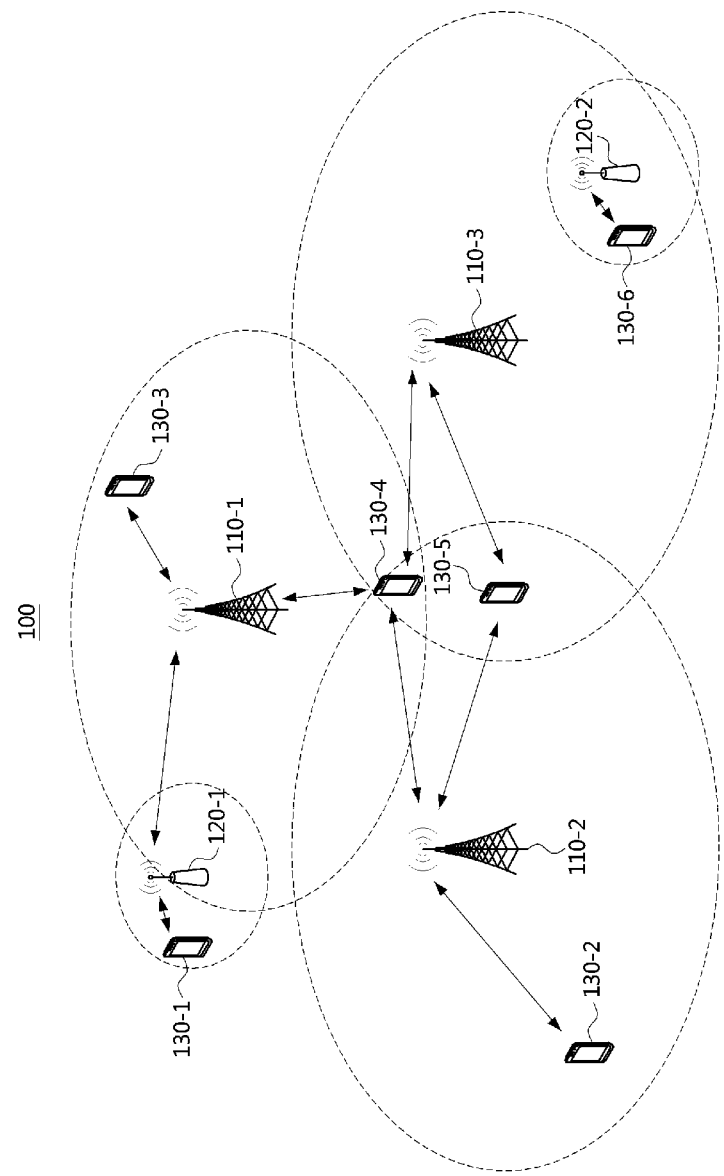
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
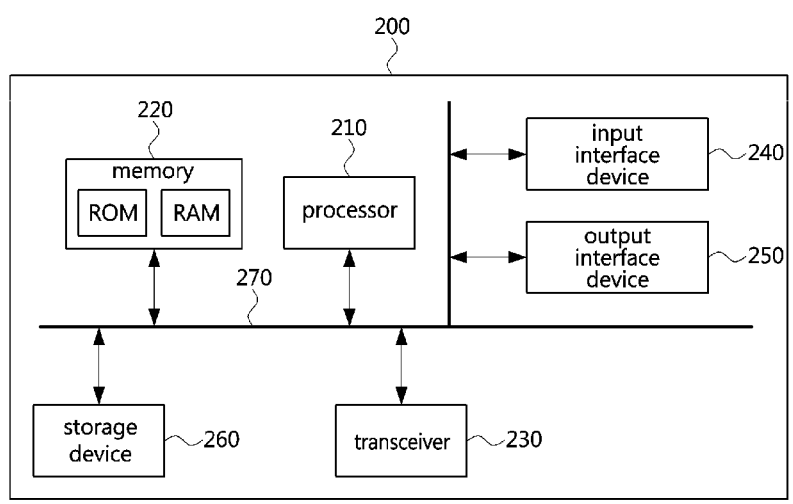
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
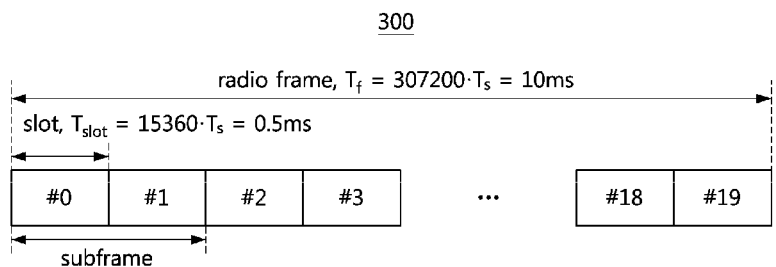
FIG. 3 is a conceptual diagram illustrating a first exemplary embodiment of a type 1 frame.

FIG. 3 is a conceptual diagram illustrating a first exemplary embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length $T_f$ of the radio frame 300 may be 10 milliseconds (ms). The length of the subframe may be 1 ms, and the length $T_{oot}$ of a slot may be 0.5 ms. Here, $T_s$ may indicate a sampling time, and may be 1/30,720,000 s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
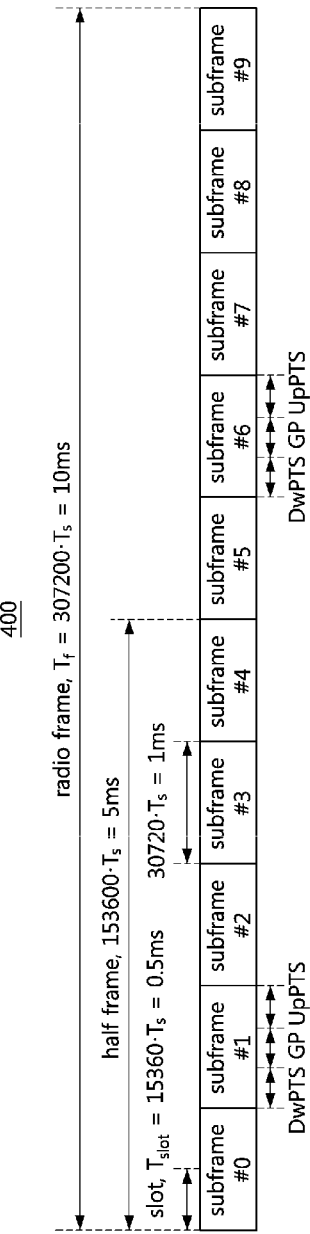
FIG. 4 is a conceptual diagram illustrating a first exemplary embodiment of a type 2 frame.

FIG. 4 is a conceptual diagram illustrating a first exemplary embodiment of a type 2 frame.

Referring to FIG. 4, a radio frame 400 may comprise two half frames, and a half frame may comprise 5 subframes. Thus, the radio frame 400 may comprise 10 subframes. The length $T_f$ of the radio frame 400 may be 10 ms. The length of the half frame may be 5 ms. The length of the subframe may be 1 ms. Here, $T_s$ may be 1/30,720,000 s.

The radio frame 400 may include at least one downlink subframe, at least one uplink subframe, and a least one special subframe. Each of the downlink subframe and the uplink subframe may include two slots. The length $T_{slot}$ of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A Gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the Gold sequence generated by being initialized by the cell ID. Thereafter, the Gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| | Numerology (μ) | | | | | |
|---|---|---|---|---|---|---|
| | 0 | 1 | 2 | 3 | 4 | 5 |
| Subcarrier spacing | 15 kHz | 30 kHz | 60 kHz | 120 kHz | 240 kHz | 480 kHz |
| OFDM symbol length [us] | 66.7 | 33.3 | 16.7 | 8.3 | 4.2 | 2.1 |
| CP length [us] | 4.76 | 2.38 | 1.19 | 0.60 | 0.30 | 0.15 |
| Number of OFDM symbols within 1 ms | 14 | 28 | 56 | 112 | 224 | 448 |

For example, the subcarrier spacing of the communication system may be configured to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

Also, in the NR system, a synchronization signal/physical broadcast channel (SS/PBCH) block may also be transmitted in a beam sweeping scheme. The SS/PBCH block may be composed of a PSS, an SSS, a PBCH, and the like. In the SS/PBCH block, the PSS, the SSS, and the PBCH may be configured in a time division multiplexing (TDM) manner. The SS/PBCH block may be referred also to as an 'SS block (SSB)'. One SS/PBCH block may be transmitted using N consecutive OFDM symbols. Here, N may be an integer equal to or greater than 4. The base station may periodically transmit the SS/PBCH block, and the terminal may acquire frequency/time synchronization, a cell ID, system information, and the like based on the SS/PBCH block received from the base station. The SS/PBCH block may be transmitted as follows.

Figure 5:
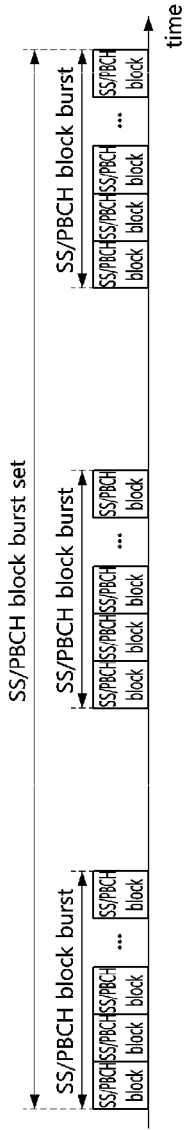
FIG. 5 is a conceptual diagram illustrating a first exemplary embodiment of a transmission method of SS/PBCH block in a communication system.

FIG. 5 is a conceptual diagram illustrating a first exemplary embodiment of a transmission method of SS/PBCH block in a communication system.

As shown in FIG. 5, one or more SS/PBCH blocks may be transmitted in a beam sweeping scheme within an SS/PBCH block burst set. Up to L SS/PBCH blocks may be transmitted within one SS/PBCH block burst set. L may be an integer equal to or greater than 2, and may be defined in the 3GPP standard. Depending on a region of a system frequency, L may vary. Within the SS/PBCH block burst set, the SS/PBCH blocks may be located consecutively or distributedly. The consecutive SS/PBCH blocks may be referred to as an 'SS/PBCH block burst'. The SS/PBCH block burst set may be repeated periodically, and system information (e.g., MIB) transmitted through the PBCHs of the SS/PBCH blocks within the SS/PBCH block burst set may be the same. An index of the SS/PBCH block, an index of the SS/PBCH block burst, an index of an OFDM symbol, an index of a slot, and the like may be indicated explicitly or implicitly by the PBCH.

Figure 6:
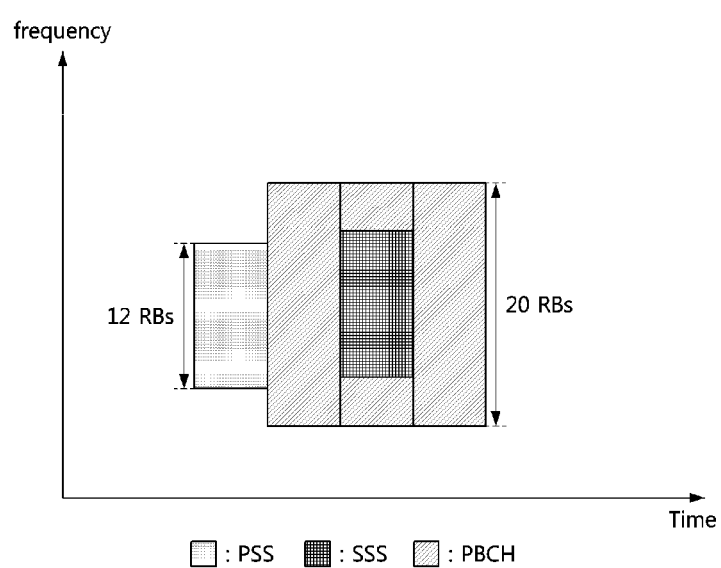
FIG. 6 is a conceptual diagram illustrating a first exemplary embodiment of an SS/PBCH block in a communication system.

FIG. 6 is a conceptual diagram illustrating a first exemplary embodiment of an SS/PBCH block in a communication system.

As shown in FIG. 6, signals and a channel are arranged within one SS/PBCH block in the order of 'PSS→PBCH→SSS→PBCH'. The PSS, SSS, and PBCH within the SS/PBCH block may be configured in a TDM scheme. In a symbol where the SSS is located, the PBCH may be located in frequency resources above the SSS and frequency resources below the SSS. That is, the PBCH may be transmitted in both end bands adjacent to the frequency band in which the SSS is transmitted. When the maximum number L of SS/PBCH blocks is 8 in the sub 6 GHz frequency band, an SS/PBCH block index may be identified based on a demodulation reference signal used for demodulating the PBCH (hereinafter, referred to as 'PBCH DMRS'). When the maximum number L of SSBs is 64 in the over 6 GHz frequency band, LSB 3 bits of 6 bits representing the SS/PBCH block index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SS/PBCH blocks may be multiplexed in the frequency domain within the system bandwidth of the NR system supporting a wide band. In this case, the SS/PBCH blocks may be transmitted as follows.

Figure 7:
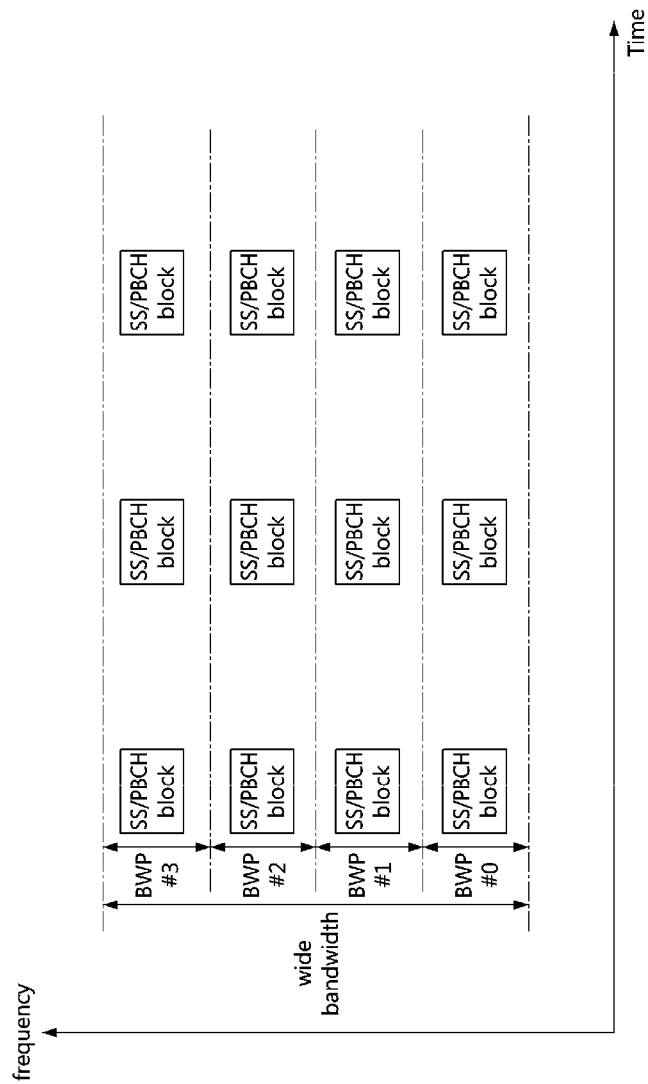
FIG. 7 is a conceptual diagram illustrating a second exemplary embodiment of a method of transmitting SS/PBCH blocks in a communication system.

FIG. 7 is a conceptual diagram illustrating a second exemplary embodiment of a method of transmitting SS/PBCH blocks in a communication system.

As shown in FIG. 7, a wideband component carrier (CC) may include a plurality of bandwidth parts (BWPs). For example, the wideband CC may include 4 BWPs. The base station may transmit SS/PBCH blocks in the respective BWPs #0 to #3 belonging to the wideband CC. The terminal may receive the SS/PBCH block(s) from one or more BWPs of the BWPs #0 to #3, and may perform an initial access procedure using the received SS/PBCH block.

After detecting the SS/PBCH block, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SS/PBCH block. A plurality of SS/PBCH blocks may be transmitted in the entire system band, and one or more SS/PBCH blocks among the plurality of SS/PBCH blocks may be SS/PBCH block(s) associated with the RMSI. The remaining SS/PBCH blocks may not be associated with the RMSI. The SS/PBCH block associated with the RMSI may be defined as a 'cell defining SS/PBCH block'. The terminal may perform a cell search procedure and an initial access procedure by using the cell-defining SS/PBCH block. The SS/PBCH block not associated with the RMSI may be used for a synchronization procedure and/or a measurement procedure in the corresponding BWP. The BWP(s) through which the SS/PBCH block is transmitted may be limited to one or more BWPs within a wide bandwidth.

The RMSI may be obtained by performing an operation to obtain configuration information of a CORESET from the SS/PBCH block (e.g., PBCH), an operation of detecting a PDCCH based on the configuration information of the CORESET, an operation to obtain scheduling information of a PDSCH from the PDCCH, and an operation to receive the RMSI through the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 8A:
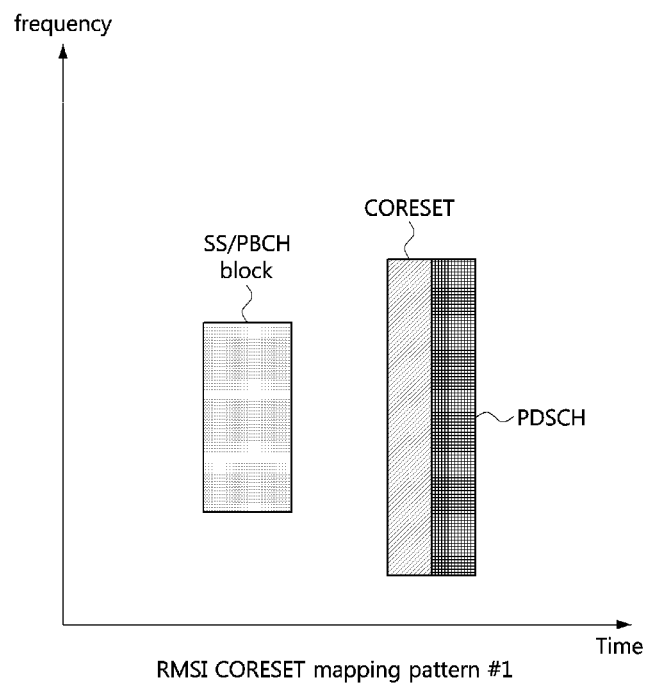
FIG. 8A is a conceptual diagram illustrating an RMSI CORESET mapping pattern #1 in a communication system.
Figure 8B:
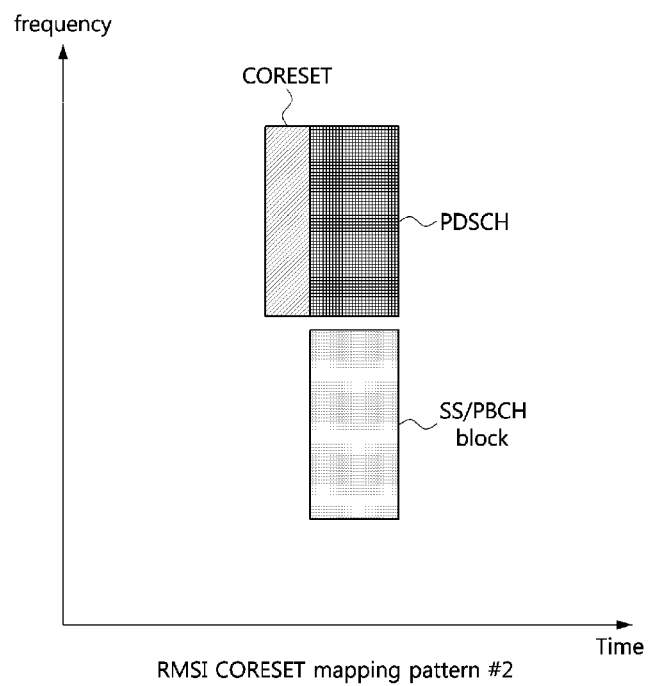
FIG. 8B is a conceptual diagram illustrating an RMSI CORESET mapping pattern #2 in a communication system.
Figure 8C:
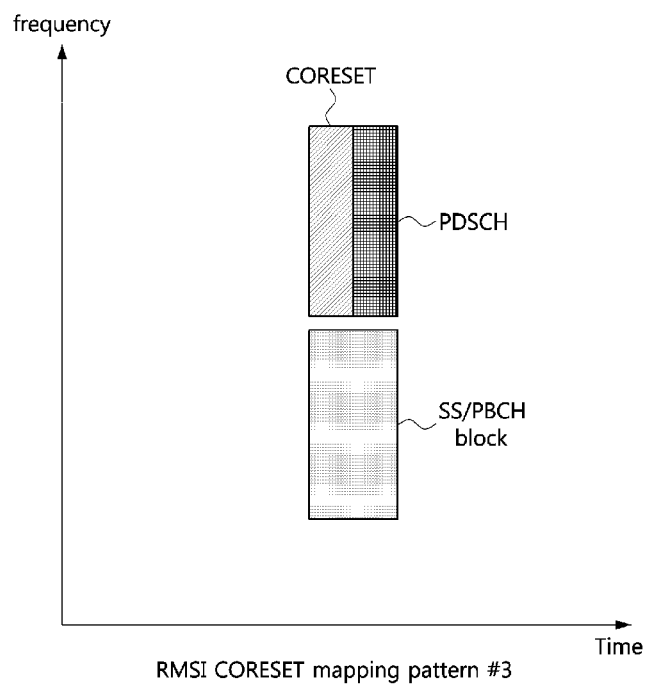
FIG. 8C is a conceptual diagram illustrating an RMSI CORESET mapping pattern #3 in a communication system.

FIG. 8A is a conceptual diagram illustrating an RMSI CORESET mapping pattern #1 in a communication system, FIG. 8B is a conceptual diagram illustrating an RMSI CORESET mapping pattern #2 in a communication system, and FIG. 8C is a conceptual diagram illustrating an RMSI CORESET mapping pattern #3 in a communication system.

As shown in FIGS. 8A to 8C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, the SS/PBCH block, the CORESET (i.e., RMSI CORESET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SS/PBCH block may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SS/PBCH block in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SS/PBCH block may be different from that of the RMSI CORESET and the RMSI PDSCH. Here, the numerology may be a subcarrier spacing. In the RMSI CORESET mapping pattern #1, a combination of all numerologies may be used. In the RMSI CORESET mapping pattern #2, a combination of numerologies (120 kHz, 60 kHz) or (240 kHz, 120 kHz) may be used for the SS/PBCH block and the RMSI CORESET/PDSCH. In the RMSI CORESET mapping pattern #3, a combination of numerologies (120 kHz, 120 kHz) may be used for the SS/PBCH block and the RMSI CORESET/PDSCH.

One RMSI CORESET mapping pattern may be selected from the RMSI CORESET mapping patterns #1 to #3 according to the combination of the numerology of the SS/PBCH block and the numerology of the RMSI CORESET/PDSCH. The configuration information of the RMSI CORESET may include Table A and Table B. Table A may represent the number of resource blocks (RBs) of the RMSI CORESET, the number of symbols of the RMSI CORESET, and an offset between an RB (e.g., starting RB or ending RB) of the SS/PBCH block and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

In the NR system, a PDSCH may be mapped to the time domain according to a PDSCH mapping type A or a PDSCH mapping type B. The PDSCH mapping types A and B may be defined as Table 2 below.

TABLE 2

| PDSCH mapping type | Normal CP | | | Extended CP | | |
|---|---|---|---|---|---|---|
| | S | L | S + L | S | L | S + L |
| Type A | {0, 1, 2, 3} (Note 1) | {3, . . ., 14} | {3, . . ., 14} | {0, 1, 2, 3} (Note 1) | {3, . . ., 12} | {3, . . ., 12} |
| Type B | {0, . . ., 12} | {2, 4, 7} | {2, . . ., 14} | {0, . . ., 10} | {2, 4, 6} | {2, . . ., 12} |

Note 1:
S = 3 is applicable only if dmrs-TypeA-Position = 3

The type A (i.e., PDSCH mapping type A) may be slot-based transmission. When the type A is used, a position of a start symbol of a PDSCH may be configured to one of {0, 1, 2, 3}. When the type A and a normal CP are used, the number of symbols constituting the PDSCH (e.g., the duration of the PDSCH) may be configured to one of 3 to 14 within a range not exceeding a slot boundary. The type B (i.e., PDSCH mapping type B) may be non-slot-based transmission. When the type B is used, a position of a start symbol of a PDSCH may be configured to one of 0 to 12. When the type B and the normal CP are used, the number of symbols constituting the PDSCH (e.g., the duration of the PDSCH) may be configured to one of {2, 4, 7} within a range not exceeding a slot boundary. A DMRS (hereinafter, referred to as 'PDSCH DMRS') for demodulation of the PDSCH (e.g., data) may be determined by a value of ID indicating the PDSCH mapping type (e.g., type A or type B) and the length. The ID may be defined differently according to the PDSCH mapping type.

Meanwhile, NR-unlicensed (NR-U) is being discussed in the NR standardization meeting. The NR-U system may increase network capacity by improving the utilization of limited frequency resources. The NR-U system may support operation in an unlicensed band (e.g., unlicensed spectrum).

In the NR-U system, the terminal may determine whether a signal is transmitted from a base station based on a discovery reference signal (DRS) received from the corresponding base station in the same manner as in the general NR system. In the NR-U system in a Stand-Alone (SA) mode, the terminal may acquire synchronization and/or system information based on the DRS. In the NR-U system, the DRS may be transmitted according to a regulation of the unlicensed band (e.g., transmission band, transmission power, transmission time, etc.). For example, according to Occupied Channel Bandwidth (OCB) regulations, signals may be configured and/or transmitted to occupy 80% of the total channel bandwidth (e.g., 20 MHz).

In the NR-U system, a communication node (e.g., base station, terminal) may perform a Listen Before Talk (LBT) procedure before transmitting a signal and/or a channel for coexistence with another system. The signal may be a synchronization signal, a reference signal (e.g., DRS, DMRS, channel state information (CSI)-RS, phase tracking (PT)-RS, sounding reference signal (SRS)), or the like. The channel may be a downlink channel, an uplink channel, a sidelink channel, or the like. In exemplary embodiments, a signal may mean the 'signal', the 'channel', or the 'signal and channel'. The LBT procedure may be an operation for checking whether a signal is transmitted by another communication node. If it is determined by the LBT procedure that there is no transmission signal (e.g., when the LBT procedure is successful), the communication node may transmit a signal in the unlicensed band. If it is determined by the LBT procedure that a transmission signal exists (e.g., when the LBT fails), the communication node may not be able to transmit a signal in the unlicensed band. The communication node may perform a LBT procedure according to one of various categories before transmission of a signal. The category of LBT may vary depending on the type of the transmission signal.

Meanwhile, NR vehicle-to-everything (V2X) communication technology is being discussed in the NR standardization meeting. The NR V2X communication technology may be a technology that supports communication between vehicles, communication between a vehicle and an infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, a PC5-RRC connection may be established between a first terminal (e.g. transmitting terminal that transmits data) and a second terminal (e.g., receiving terminal that receives data), and the PC5-RRC connection may refer to a logical connection for a pair between a source ID of the first terminal and a destination ID of the second terminal. The first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'HARQ-ACK', 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In the groupcast sidelink communication, two HARQ-ACK feedback schemes (i.e., transmission procedures of feedback information) may be supported. When the number of receiving terminals in a sidelink group is large and a service scenario 1 is supported, some receiving terminals belonging to a specific range within the sidelink group may transmit NACK through a PSFCH when data reception fails. This scheme may be a groupcast HARQ-ACK feedback option 1. In the service scenario 1, instead of all the receiving terminals in the sidelink group, it may be allowed for some receiving terminals belonging to a specific range to perform reception in a best-effort manner. The service scenario 1 may be an extended sensor scenario in which some receiving terminals belonging to a specific range need to receive the same sensor information from a transmitting terminal. In exemplary embodiments, the transmitting terminal may refer to a terminal transmitting data, and the receiving terminal may refer to a terminal receiving data.

When the number of receiving terminals in the sidelink group is limited and a service scenario 2 is supported, each of all the receiving terminals belonging to the sidelink group may report HARQ-ACK for data individually through a separate PSFCH. This scheme may be a groupcast HARQ-ACK feedback option 2. In the service scenario 2, since PSFCH resources are sufficient, the transmitting terminal may perform monitoring on HARQ-ACK feedbacks of all the receiving terminals belonging to the sidelink group, and data reception may be guaranteed at all the receiving terminals belonging to the sidelink group.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

A time period required for the ACG operation may be 15 vs. When a subcarrier spacing of 15 kHz is used in the NR system, a time period (e.g., length) of one symbol (e.g., OFDM symbol) may be 66.7 μs. When a subcarrier spacing of 30 kHz is used in the NR system, a time period of one symbol (e.g., OFDM symbol) may be 33.3 μs. In the following exemplary embodiments, a symbol may mean an OFDM symbol. That is, a time period of one symbol may be twice or more than a time period required for the ACG operation.

For sidelink communication, it may be necessary to transmit a data channel for data transmission and a control channel including scheduling information for data resource allocation. In sidelink communication, the data channel may be a physical sidelink shared channel (PSSCH), and the control channel may be a physical sidelink control channel (PSCCH). The data channel and the control channel may be multiplexed in a resource domain (e.g., time and frequency resource domains).

Figure 9:
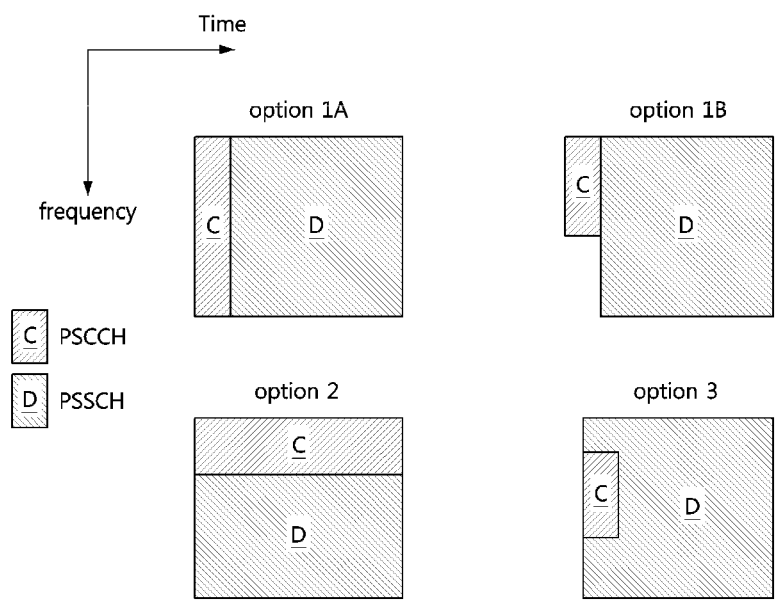
FIG. 9 is a conceptual diagram illustrating exemplary embodiments of a method for multiplexing a control channel and a data channel in sidelink communication.

FIG. 9 is a conceptual diagram illustrating exemplary embodiments of a method for multiplexing a control channel and a data channel in sidelink communication.

Referring to FIG. 9, sidelink communication may support an option 1A, an option 1B, an option 2, and an option 3. When the option 1A and/or the option 1B is supported, a control channel and a data channel may be multiplexed in the time domain. When the option 2 is supported, a control channel and a data channel may be multiplexed in the frequency domain. When the option 3 is supported, a control channel and a data channel may be multiplexed in the time and frequency domains. The sidelink communication may basically support the option 3.

In the sidelink communication (e.g., NR-V2X sidelink communication), a basic unit of resource configuration may be a subchannel. The subchannel may be defined with time and frequency resources. For example, the subchannel may be composed of a plurality of symbols (e.g., OFDM symbols) in the time domain, and may be composed of a plurality of resource blocks (RBs) in the frequency domain. The subchannel may be referred to as an RB set. In the subchannel, a data channel and a control channel may be multiplexed based on the option 3.

In the sidelink communication (e.g., NR-V2X sidelink communication), transmission resources may be allocated based on a mode 1 or a mode 2. When the mode 1 is used, a base station may allocate sidelink resource(s) for data transmission within a resource pool to a transmitting terminal, and the transmitting terminal may transmit data to a receiving terminal using the sidelink resource(s) allocated by the base station. Here, the transmitting terminal may be a terminal that transmits data in sidelink communication, and the receiving terminal may be a terminal that receives the data in sidelink communication.

When the mode 2 is used, a transmitting terminal may autonomously select sidelink resource(s) to be used for data transmission by performing a resource sensing operation and/or a resource selection operation within a resource pool. The base station may configure the resource pool for the mode 1 and the resource pool for the mode 2 to the terminal(s). The resource pool for the mode 1 may be configured independently from the resource pool for the mode 2. Alternatively, a common resource pool may be configured for the mode 1 and the mode 2.

Hereinafter, methods for coordination and allocation of one or more sidelink resources in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a transmitting terminal is described, a corresponding receiving terminal may perform an operation corresponding to the operation of the transmitting terminal. Conversely, when an operation of a receiving terminal is described, a corresponding transmitting terminal may perform an operation corresponding to the operation of the receiving terminal.

When the mode 1 is used, the base station may schedule a resource used for sidelink data transmission to the transmitting terminal, and the transmitting terminal may transmit sidelink data to the receiving terminal by using the resource scheduled by the base station. Therefore, a resource collision between terminals may be prevented. When the mode 2 is used, the transmitting terminal may select an arbitrary resource by performing a resource sensing operation and/or resource selection operation, and may transmit sidelink data by using the selected arbitrary resource. Since the above-described procedure is performed based on an individual resource sensing operation and/or resource selection operation of each transmitting terminal, a collision between selected resources may occur. Therefore, even when the mode 2 is used, as in the mode 1, a coordination operation of resources for data transmission and reception between terminals, an operation of configuring a terminal performing the coordination operation, an operation of configuring a terminal notifying a resource(s) according to the coordination operation, data transmission/reception operations between terminals using the coordinated resources, and the like may be performed. When the above-described operations are performed, collisions between resources may be reduced, and communication performance may be improved. When a resource sensing operation and/or resource selection operation are performed within restricted resources (e.g., coordinated resources), energy efficiency may be improved.

When the mode 2 is used, a terminal in charge of resource coordination and/or allocation for data transmission and reception between terminals may be selected. When the resource coordination and/or allocation is performed by the selected terminal, collision between resources in sidelink communication may be reduced. Various scenarios supporting the above-described operations may exist. In groupcast communication (i.e., groupcast sidelink communication), 'communication between member terminals belonging to a groupcast group' and/or 'communication between a member terminal belonging to a groupcast group and a terminal not belonging to the groupcast group' may be performed. A transmitting terminal in the groupcast communication (hereinafter referred to as a 'groupcast (GC) transmitting terminal') may perform a resource coordination and/or allocation operation for the communication between member terminals belonging to the groupcast group and/or the communication between a member terminal belonging to the groupcast group and a terminal not belonging to the groupcast group. The GC transmitting terminal may be referred to as a 'coordinating' terminal.

In exemplary embodiments, methods in which a GC transmitting terminal periodically transmits information on resources suitable for communication to member terminals in a groupcast group will be proposed. The GC transmitting terminal may transmit information on resources available for the communication between member terminals belonging to the groupcast group' and/or the communication between a member terminal belonging to the groupcast group and a terminal not belonging to the groupcast group as well as sidelink data for its own groupcast communication. Specifically, the GC transmitting terminal may recognize all member terminals in the groupcast group. In this case, the GC transmitting terminal may individually configure a usable resource region according to a member ID of each of the member terminals in the groupcast group, and may transmit information on the configured resource. The member ID may be a unique ID for identifying the corresponding member terminal within the groupcast group.

When a resource region includes a plurality of resource sets, the GC transmitting terminal may configure one or more resource sets to each of the member terminals in the groupcast group, and transmit information related to the one or more resource sets. Each of the member terminals in the sidelink group may receive the resource information from the GC transmitting terminal, select some resources (e.g., resource set) by performing a resource sensing and/or selection operation or a random selection operation on the resource set(s) indicated by the resource information, and perform sidelink communication by using the selected resources. In exemplary embodiments, the resource sensing and/or selection operation may refer to a 'resource sensing operation', a 'resource selection operation', or a 'resource sensing operation and resource selection operation'.

Figure 10:
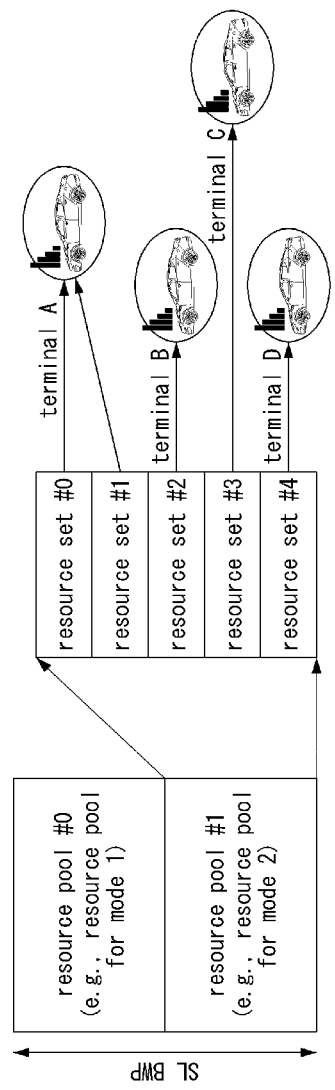
FIG. 10 is a conceptual diagram illustrating a first exemplary embodiment of a method for configuring a resource set(s).

FIG. 10 is a conceptual diagram illustrating a first exemplary embodiment of a method for configuring a resource set(s).

As shown in FIG. 10, a resource pool for the mode 2 may be configured independently of a resource pool for the mode 1. When the mode 2 is used, a resource region (e.g., resource pool) for transmission and reception of sidelink data may be divided into a plurality of resource sets, and one or more resource sets may be allocated to member terminal(s) (e.g., one member terminal) within a sidelink group. The resource set(s) configured for the member terminal may be associated with (or mapped to) to a member ID of the member terminal. That is, a mapping relationship (e.g., association relationship) between resource set index(es) and a member ID may be configured. The resource set(s) of the member terminals may be signaled based on the mapping relationship between resource set index(es) and member IDs.

Specifically, the GC transmitting terminal may transmit a combination of {member ID, resource set index}. When it is possible to allocate a plurality of resource sets to one member terminal, a combination form of {member ID, resource set index #A, resource set index #B, resource set index #C} may be signaled. A signaling operation for a plurality of member terminals may be performed in a form combined in the order of member IDs. The GC transmitting terminal may transmit configuration information of resource set(s) for a plurality of member terminals by using a groupcast scheme. The configuration information of the resource set(s) may be included in $1^{st}$ sidelink control information (SCI), $2^{nd}$ SCI, and/or sidelink data.

The maximum number of allocable resource sets may be pre-configured. When resource sets as many as the maximum number of allocable resource sets are not configured, a field corresponding to an unconfigured resource set (e.g., unallocated resource set) may be configured to a specific value (e.g., a specific resource set index, a binary number comprising all '0's (e.g., '000 . . . 000'), or a binary number comprising all '1's (e.g., '111 . . . 111')). For example, when the maximum number of allocable resource sets is 3 and two resource sets (e.g., resource sets #A and #B) are configured, the GC transmitting terminal may configure {member ID, resource set index #A, resource set index #B, '111 . . . 111'}, and may signal the configured information (e.g., {member ID, resource set index #A, resource set index #B, '111 . . . 111'}).

Alternatively, when member IDs are sequentially configured, member IDs mapped to resource set indexes may not be signaled. In this case, the GC transmitting terminal may inform the member terminal(s) of the configuration information of the resource set(s) without member IDs through the signaling. The member terminal(s) may receive the configuration information from the GC transmitting terminal, and identify (or select) resource set(s) for itself in consideration of the order of the member IDs among the resource set(s) indicated by the configuration information.

Some resources within the allocated resource set(s) may be used for actual data transmission. In this case, the member terminal(s) in the sidelink group may select a resource (e.g., resource region) by performing a resource sensing and/or selection operation or a random selection operation within the resource set(s), and perform sidelink communication by using the selected resource. The operation performed for resource selection within a resource set (e.g., resource sensing and/or selection operation or random selection operation) may be configured by system information and/or an RRC message. The system information and/or RRC messages may be transmitted from the base station. The GC transmitting terminal may inform the member terminal(s) of the operation to be performed for resource selection within the resource set. In this case, the operation performed for resource selection within the resource set may be configured by the GC transmitting terminal. The GC transmitting terminal may inform the operation to be performed for resource selection within the resource set together with the resource information (e.g., resource allocation information).

In a sidelink group, one or more resource sets may be allocated to a member terminal. In this case, the member terminal may perform sidelink communication with another member terminal belonging to the sidelink group or another terminal not belonging to the sidelink group by using resource(s) belonging to the one or more resource sets. When communication is performed between member terminals belonging to the sidelink group, resource sets allocated to the member terminals may be shared, and sidelink communication between the member terminals may be performed using the shared resource sets. For example, in the exemplary embodiment shown in FIG. 10, a terminal A and a terminal C may be member terminals belonging to a sidelink group. For sidelink communication between the terminal A and the terminal C, resource sets #0 and #1 allocated to the terminal A and a resource set #3 allocated to the terminal C may be shared with each other. The terminal A and terminal C may select resource(s) by performing a resource sensing and/or selection operation or a random selection operation in all the resource sets #0, #1, and #3, and sidelink communication between the terminal A and the terminal C may be performed using the selected resource(s).

The terminal A and terminal C may perform a monitoring operation for data reception in all of the resource sets #0, #1, and #3. According to the above-described method, sidelink resources may be used efficiently. For example, when only the resource set #3 is allocated to the terminal C without sharing the resource sets #0 and #1 and more resources than the resource set #3 are required for data transmission of the terminal C, a data transmission latency may occur in the terminal C. However, when the terminal C shares resources with the terminal A, the terminal C may use the resource sets #0, #1, and #3 for data transmission. Accordingly, the terminal C may transmit data without a transmission latency.

When data (e.g., sidelink data) can be transmitted through consecutive subchannels in the frequency domain and resources required for data transmission are small, each of the terminal A and terminal C may select a suitable resource by performing a resource sensing and/or selection operation or a random selection operation in the resource set #3 or the resource sets #0 and #1, and may perform sidelink communication by using the selected suitable resource. The suitable resource may be referred to as a 'recommended resource' or 'preferred resource'. When data (e.g., sidelink data) can be transmitted through consecutive subchannels in the frequency domain and resources required for data transmission are large, each of the terminal A and terminal C may select a suitable resource by performing a resource sensing and/or selection operation or a random selection operation in the resource sets #0 and #1 instead of the resource set #3, and may perform sidelink communication by using the selected suitable resource. When data transmission is possible through non-consecutive subchannels in the frequency domain, each of the terminal A and terminal C may select a suitable resource by performing a resource sensing and/or selection operation or a random selection operation in the resource sets #0, #1, and #3, and may perform sidelink communication by using the selected suitable resource.

Alternatively, in sidelink communication between member terminals in a sidelink group, each member terminal may transmit data only within a resource set allocated to it. For example, in the exemplary embodiment shown in FIG. 10, when sidelink communication between the terminal A and the terminal C, which are member terminals, is performed in the sidelink group, the terminal A may use the resource sets #0 and #1 allocated to itself to transmit data, and the terminal C may use the resource set #3 allocated to itself to transmit data. The terminal A may perform monitoring for data reception in the resource set #3 allocated to the terminal C, and the terminal C may perform monitoring for data reception in the resource sets #0 and #1 allocated to the terminal A. When the terminal (e.g., member terminal) performs a resource sensing and/or selection operation for data transmission based on the above-described method, the size of the resource region in which the resource sensing and/or selection operation is performed may be restricted. In addition, the size of the resource region in which a monitoring operation for data reception is performed may be restricted. In this case, the complexity of the terminal may be reduced, and energy efficiency may be increased.

In sidelink communication between member terminals in a sidelink group, a member terminal may identify its own member ID and/or a member ID of a counterpart member terminal by a PC5-RRC connection configuration procedure and/or a signaling procedure by a GC transmitting terminal. The member terminal may identify resource information (e.g., resource set information) associated with the member ID based on the resource allocation information obtained from the GC transmitting terminal.

In the exemplary embodiment shown in FIG. 10, a plurality of resource sets may be configured not to overlap each other in the time-frequency domain within the resource pool. Alternatively, in order to improve resource efficiency, a plurality of resource sets may be configured to overlap in the time-frequency domain. In the exemplary embodiment shown in FIG. 10, the same time resource may be allocated to all terminals. It may be possible to allocate different time resources to the member terminals so that a half-duplex issue in which data transmission/reception times overlap between the member terminals does not occur.

The GC transmitting terminal may periodically transmit resource allocation information (e.g., configuration information of the plurality of resource sets) to the member terminals in the sidelink group. Alternatively, the resource allocation information may be transmitted when a previously allocated resource set is changed. In this case, the resource allocation information may include only changed information. Accordingly, a signaling overhead of the resource allocation information may be reduced.

Alternatively, when a request for resource allocation is received from a member terminal belonging to the sidelink group, the GC transmitting terminal may transmit resource allocation information. A resource region (e.g., resource set) may be divided into units of time and frequency resources having a predetermined size. The resource region (e.g., resource set, time and frequency resources) may be divided according to a certain resource pattern. That is, the division unit of the resource region may be a time and frequency resource or a resource pattern. In this case, the GC transmitting terminal may allocate one or more resource regions to each member terminal. When a plurality of resource regions are allocated, the member terminal may randomly select a resource region(s) from among the plurality of resource regions, and may transmit data by using the selected resource region(s).

Figure 11:
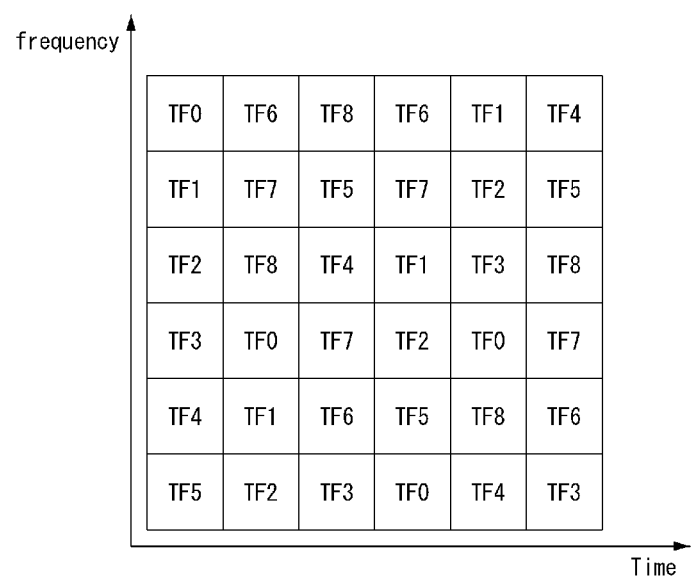
FIG. 11 is a conceptual diagram illustrating a first exemplary embodiment of a resource pattern for time and frequency resources.

FIG. 11 is a conceptual diagram illustrating a first exemplary embodiment of a resource pattern for time and frequency resources.

As shown in FIG. 11, a resource region (e.g., resource set) may be divided into time and frequency resources each having a predetermined size. For example, a TF may refer to one time and frequency resource having a predetermined size. TFs may be configured to be randomly distributed according to a specific pattern in the time and frequency domain. Each of TF0, TF1, TF2, TF3, TF4, TF5, TF6, TF7, and TF8 may be one resource pattern. One or more resource patterns may be allocated to each terminal (e.g., each member terminal). Information on one or more resource patterns may be included in the resource allocation information (e.g., resource coordination information). The terminal may randomly select a resource from within the allocated resource pattern(s), and may transmit actual data using the selected resource. The above-described method of configuring and transmitting the resource allocation information (e.g., resource coordination information) may be applicable not only to groupcast communication but also to unicast communication and/or broadcast communication. In unicast communication, a transmitting terminal may transmit resource allocation information to a receiving terminal using PC5-RRC signaling.

In a scenario supporting unicast communication, groupcast communication, and broadcast communication, for sidelink communication between terminals, a terminal (hereinafter referred to as a 'coordinating terminal') performing a resource coordination and/or allocation function may be configured, and the coordinating terminal may perform a resource coordination and/or allocation role for sidelink communication between terminals. The coordinating terminal may be a transmitting terminal or a receiving terminal. The coordinating terminal may be the above-described GC transmitting terminal. Alternatively, the coordinating terminal may be a third terminal other than the transmitting terminal and the receiving terminal. The third terminal may be selected from among terminals adjacent to the transmitting terminal or terminals adjacent to the receiving terminal.

"When the coordinating terminal is the transmitting terminal" or "when the coordinating terminal is selected from among terminals adjacent to the transmitting terminal", the coordinating terminal may inform information on resources suitable for sidelink transmission, and may inform information on resources not suitable for sidelink transmission. The above-described information may be transmitted from the coordinating terminal to the transmitting terminal. The resources that are not suitable may be referred to as 'non-recommended resources' or 'non-preferred resources'.

When the coordinating terminal is the receiving terminal or the coordinating terminal is selected from among terminals adjacent to the receiving terminal, the coordinating terminal may inform information on resources suitable for receiving sidelink data, and may inform information on resources that are not suitable for receiving sidelink data. The above-described information may be transmitted from the coordinating terminal to the transmitting terminal.

The above-described information may be configured according to the size of available resources and/or resource pool. For example, when the size of resource coordination information (e.g., resource allocation information) is limited, the type of information suitable for the size may be selected, and the selected information may be transmitted. Whether the above-described information is information on resources suitable for sidelink communication (e.g., sidelink transmission and/or reception) or information on resources not suitable for sidelink communication may be preconfigured. The information type (e.g., information on resources suitable for sidelink communication or information on resources not suitable for sidelink communication) may be configured by system information, RRC signaling (e.g., UE-specific RRC signaling), a MAC control element (CE), and/or control information (e.g., downlink control information (DCI), SCI). Alternatively, the information type may be indicated by a separate indicator. In this case, the information type may be signaled together with the resource coordination information (e.g., resource allocation information).

The transmitting terminal may select resource(s) to be used for sidelink data transmission based on the resource coordination information, and may transmit sidelink data by using the selected resource(s). When the resource coordination information is information on resources suitable for sidelink communication (e.g., sidelink transmission and/or reception), the resource(s) indicated by the resource coordination information may be used for sidelink data transmission as they are. In addition, the resource(s) indicated by the resource coordination information may be used after performing a re-evaluation operation for identifying whether there is a collision due to aperiodic data transmission of another terminal or a pre-emption operation for identifying whether the corresponding resource(s) is pre-empted due to transmission of data having a higher priority than that of another terminal. In addition, a selection operation (e.g., resource sensing and/or selection operation or random selection operation) of a transmission resource of sidelink data within the resources indicated by the resource coordination information may be additionally performed.

When the resources indicated by the resource coordination information are resources suitable for data transmission, the transmitting terminal may perform data transmission based on the resource coordination information. If a ratio of the resources indicated by the resource coordination information among all the resources is greater than or equal to a specific ratio (e.g., X %), the transmitting terminal may select resources to be used for actual transmission within the resources (e.g., candidate resources) indicated by the resource coordination information, and may perform data transmission using the selected resources. If the ratio of the resources indicated by the resource coordination information among all the resources is less than the specific ratio (e.g., X %), the transmitting terminal may determine all candidate resources that are a union of the resources (e.g., candidate resources) indicated by the resource coordination information and the candidate resources secured by the additional resource sensing operation, select resource to be used for actual transmission among all the candidate resources, and perform data transmission using by the selected resources.

The specific ratio (e.g., X %) may be configured by system information, RRC signaling (e.g., UE-specific RRC signaling), MAC CE, and/or control information (e.g., DCI, SCI). Alternatively, regardless of whether the ratio of the resources (e.g., candidate resources) indicated by the resource coordination information among all the resources is equal to or greater than the specific ratio, the transmitting terminal may select the resources to be used for actual transmission within the candidate resources, and perform data transmission by using the selected resources. In addition, the transmitting terminal may determine all candidate resources that are a union of the candidate resources indicated by the resource coordination information and the candidate resources secured by the additional resource sensing operation, select resources to be used for actual transmission among all the candidate resources, and perform data transmission by using the selected resources. Whether to apply the additional candidate resources secured by the additional resource sensing operation may be determined according to a sensing capability of the terminal. For example, a terminal that cannot perform a resource sensing operation may select resources to be used for actual transmission by using only the resource coordination information. A terminal capable of performing a resource sensing operation may select resources to be used for actual transmission among the resources secured by the resource sensing operation as well as the resources indicated by the resource coordination information.

When both the resource coordination information and the result of the additional resource sensing operation exist, priority of resource selection may be required in the resource selection procedure. For example, if an overlapped resource(s) between the resources (e.g., resource region) indicated by the resource coordination information and the resources (e.g., resource region) according to the result of the additional resource sensing operation exists, the overlapped resource(s) may have a highest priority. The overlapped resource(s) may mean common resource(s) or same resource(s) between the resources indicated by the resource coordination information and the resources according to the result of the additional resource sensing operation. The priority of the resource coordination information may be configured to be higher than the priority of the result of the additional resource sensing operation, and in this case, the resources indicated by the resource coordination information may be preferentially selected. The priority of the result of the additional resource sensing operation may be configured to be higher than the priority of the resource coordination information, and in this case, the resources according to the result of the additional resource sensing operation may be preferentially selected. The resources may be selected from a union or intersection of the resources indicated by the resource coordination information and the resources according to the result of the additional resource sensing operation. This operation may be performed when the priority of the resource coordination information is the same as the priority of the result of the additional resource sensing operation.

When the additional resource sensing operation is performed on resources other than the resource region indicated by the resource coordination information, the priority of the resource coordination information may be configured to be the same as the priority of the result of the additional resource sensing operation. Alternatively, one of the resource coordination information and the result of the additional resource sensing operation may have a relatively high priority. The above-mentioned priority may be preconfigured. For example, the above-mentioned priority may be configured by system information, RRC signaling, MAC CE, and/or control information. That is, information indicating the above-described priority may be transmitted to the terminal (e.g., transmitting terminal).

In addition, whether to apply the additional candidate resources secured through the resource sensing operation may depend on configuration of the coordinating terminal. For example, when one coordinating terminal provides resource coordination information to a plurality of terminals, it may be preferable for the plurality of terminals to select resources to be used for actual transmission within the resources indicated by the resource coordination information. For example, when a plurality of terminals select resources to be used for actual transmission from among the resources indicated by the resource coordination information and the resources secured through the additional resource sensing operation, since coordination on the resources secured through the additional resource sensing operation was not performed, a resource collision may occur between the plurality of terminals. In this case, it may be preferable for each of the plurality of terminals to select resources by referring only to the resource coordination information obtained from the coordinating terminal.

It may be difficult for the terminals receiving the resource coordination information to determine whether the resource coordination information is information that has been obtained by coordination between a plurality of terminals. Therefore, it may be preferable to signal a separate indicator indicating whether the resource coordination information is information that has been coordinated between a plurality of terminals. For example, an indicator having a size of 1 bit may indicate whether the resource coordination information is information that has been coordinated between a plurality of terminals. That is, the indicator may instruct the terminal to perform communication in consideration of only the resource coordination information or to perform communication in consideration of the result of the additional resource sensing operation as well as the resource coordination information. The indicator may be transmitted in advance to each of the terminals through separate signaling. Alternatively, the indicator may be signaled to each of the terminals together with the resource coordination information. Resources coordinated between a plurality of terminals may refer to resources in which a collision does not occur between the plurality of terminals.

Even when performing of communication in consideration of the result of the additional resource sensing operation as well as the resource coordination information is indicated, the terminal without resource sensing capability may perform a resource selection operation using only the resource coordination information. When the resources indicated by the resource coordination information are resources not suitable for data transmission, the transmitting terminal may perform data transmission based on the resource coordination information. That is, since the resources indicated by the resource coordination information are resources not suitable for data transmission, the transmitting terminal may perform a sensing operation in resources other than the resource region indicated by the resource coordination information, and may perform a resource selection operation based on a result of the sensing operation. According to the resource coordination information, resource regions in which the sensing operation is performed may be reduced, and efficient resource sensing may be possible. Since a resource region that is not suitable for data transmission of a specific terminal may be suitable for data transmission of another terminal, efficient resource coordination between terminals may be possible. Alternatively, the transmitting terminal may select resources by performing a random selection operation within resources outside the inappropriate resource region indicated by the resource coordination information.

In another exemplary embodiment, the resource coordination information may indicate information indicating whether a collision actually occurs in the selected resource of the transmitting terminal, information indicating whether a collision in the selected resource of the transmitting terminal is predicted, or information indicating whether a potential collision exists in the selected resource of the transmitting terminal. For example, when a resource actually used by the transmitting terminal for data transmission collides with a resource used by another terminal, or when a resource reserved by the transmitting terminal for data transmission overlaps with a resource reserved by another terminal, the coordinating terminal may identify a collision before or after the actual collision, and inform the transmitting terminal of collision-related information. If the resource coordination information is collision-related information after a collision occurs, the transmitting terminal receiving the resource coordination information may determine whether to perform a retransmission operation based on a HARQ-ACK (e.g., ACK or NACK) received from the receiving terminal.

For example, even in case that a resource collision occurs (e.g., even in case that the resource coordination information indicates that an actual collision occurs), the transmitting terminal may not perform a retransmission operation when ACK is received from the receiving terminal. On the other hand, when NACK is received from the receiving terminal, the transmitting terminal may perform a retransmission operation on the corresponding data. Alternatively, the receiving terminal may not be able to determine whether data reception is successful, and may not be able to transmit a HARQ-ACK for data to the transmitting terminal. In this case, the receiving terminal may determine that a collision occurs in the resource, and may transmit resource collision information to the transmitting terminal. When the resource collision information is received from the receiving terminal, the transmitting terminal may perform reselection of the resource for retransmission and retransmission of the data using the reselected resource. Alternatively, the retransmission of the data may be performed without the resource reselection.

When a HARQ-ACK feedback operation for data transmitted to the receiving terminal is not supported (e.g., when the HARQ-ACK feedback operation is disabled), the transmitting terminal may perform a retransmission operation based on the collision-related information indicated by the resource coordination information. For example, when the resource coordination information indicates that a resource collision has occurred (e.g., when information indicating that an actual collision has occurred is obtained from the resource coordination information), the transmitting terminal may perform reselection of the resource for retransmission and a retransmission operation for the data using the reselected resource. Alternatively, the retransmission of the data may be performed without the resource reselection. On the other hand, when the resource coordination information does not indicate that a resource collision has occurred, the transmitting terminal may not perform a retransmission operation. When the resource coordination information indicates information on a potential collision, the transmitting terminal may perform a transmission resource reselection operation based on the resource coordination information.

After transmission of the resource coordination information, an application time of the resource coordination information may be configured differently according to the type of resource coordination information. Specifically, the application time of the resource coordination information may be configured differently according to a transmission pattern of the resource coordination information in the time domain. In case that the resource coordination information is transmitted periodically, the terminal may perform a resource selection operation by applying the resource coordination information after the reception of the resource coordination information (e.g., reception time of the resource coordination information+processing time) until a next period reception/application time of resource coordination. In case that the resource coordination information is transmitted aperiodically (e.g., in case that the resource coordination information is transmitted when a specific event occurs), the terminal may perform a resource selection operation by applying the resource coordination information until new resource coordination information is received by occurrence of a next event. In case that the resource coordination information is transmitted according to a request (e.g., a request for data transmission), after receiving the resource coordination information, the terminal may apply the resource coordination information until a completion time of initial transmission of the corresponding data or a completion time of one or more retransmissions for the corresponding data.

The above-described resource coordination information transmitted by the coordinating terminal may be information on a resource used for actual transmission or information on resources (e.g., recommended resources or non-recommended resources) to be referenced to select a resource used for actual transmission. Signaling methods for transmitting the resource coordination information may be important. Accordingly, methods for expanding and applying existing resource reservation information will be proposed in exemplary embodiments. The transmitting terminal may transmit information on a resource used for actual transmission or information on a resource scheduled to be used for actual transmission through a control channel. Information on up to three resources may be transmitted on one control channel.

The transmitting terminal may transmit information on more than three resources through one control channel. That is, the maximum number of resources transmittable through one control channel may be increased. In this case, the existing signaling scheme may be reused, and thus signaling overhead may be reduced. The maximum number (e.g., $R_{MAX}$) of resources (e.g., resource regions) that can be signaled through resource coordination information may be pre-configured. Alternatively, $R_{MAX}$ may be configured by system information, RRC signaling, MAC CE, and/or control information (e.g., DCI, SCI). A resource for signaling of the resource coordination information may be configured differently from a resource used for actual transmission (e.g., data transmission). Specifically, a unit of a resource used for signaling of the resource coordination information may be configured to be larger than a unit of a resource used for actual transmission. The resource information (e.g., resource region, subchannel size, resource pool, and so on) may be indicated by the resource coordination information.

For example, a size of a subchannel for signaling of the resource coordination information (e.g., a size of a subchannel indicated by the resource coordination information) may be configured to be larger than a size of a subchannel for data transmission, and in this case, signaling overhead of resource coordination information may be reduced. When the resource coordination information indicates recommended resources (e.g., resources suitable for sidelink communication), resources used for data transmission may be selected through a resource sensing and/or selection operation or a random selection operation from among the resources indicated by the resource coordination information. When the resource coordination information indicates non-recommended resources (e.g., resources not suitable for sidelink communication), the resources used for actual data transmission may be selected through a resource sensing and/or selection operation or a random selection operation from among resources other than the resource region indicated by the resource coordination information. In order to configure a resource used for signaling of the resource coordination information to be different from a resource used for actual data transmission/reception, a resource pool for the resource coordination information may be separately configured. Configuration information of the resource pool for the resource coordination information may be transmitted by system information and/or RRC signaling. The resource coordination information may be transmitted and received in the resource pool configured for the resource coordination information. Alternatively, parameters (e.g., subchannel size and/or $R_{tx}$) for signaling of the resource coordination information may be added to the existing configuration information of the resource pool for sidelink communication. The resource pool may be indicated by the resource coordination information.

Figure 12:
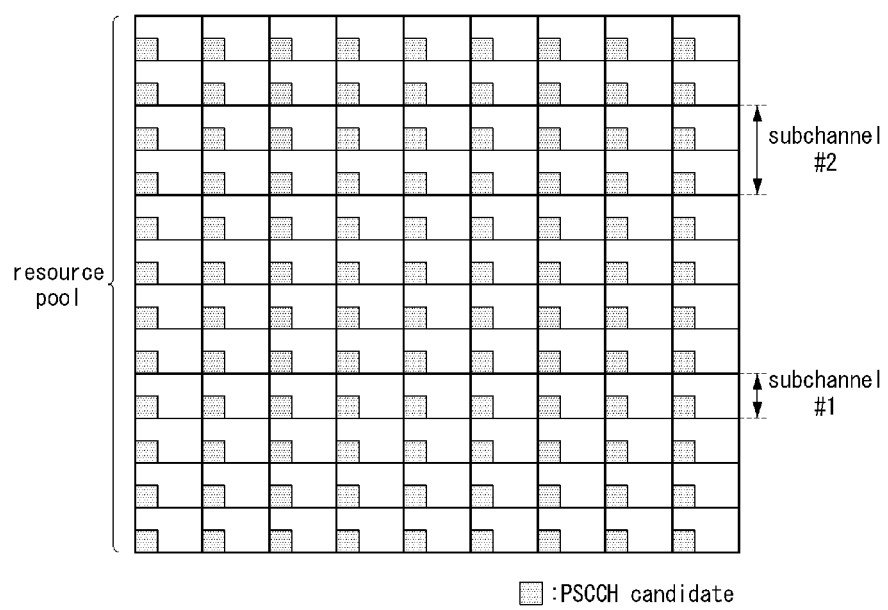
FIG. 12 is a conceptual diagram illustrating a first exemplary embodiment of configuration of a resource pool for resource coordination.

FIG. 12 is a conceptual diagram illustrating a first exemplary embodiment of configuration of a resource pool for resource coordination.

As shown in FIG. 12, information on a resource for transmission and reception of actual data may be configured independently of information on a resource for signaling of the resource coordination information. For example, a resource for transmission and reception of data may be different from a resource for transmission and reception of the resource coordination information. A subchannel #1 may be used for transmission and reception of data, and a subchannel #2 may be used for transmission (e.g., signaling) of the resource coordination information. The size of the subchannel #2 may be twice the size of the subchannel #1. In this case, an overhead required for signaling of the resource coordination information may be reduced. The resources used for transmission and reception of data may be selected by performing a resource sensing and/or selection operation or a random selection operation in resources indicated by the resource coordination information (e.g., recommended resources) and/or resources not indicated by the resource coordination information (e.g., non-recommended resources).

The size of the subchannel #2 for signaling of the resource coordination information may be configured to n times the size of the subchannel #1 for data transmission and reception. n may be a natural number. The size of the subchannel #2 may not be accurately set to n times the size of the subchannel #1. In this case, when the size of the last resource region is greater than or equal to the size of the subchannel #1 for data transmission and reception, and the size of the last resource region is less than the size of the subchannel #2 for transmission and reception of the resource coordination information, the last resource region may be indicated by signaling of the resource coordination information, and may be used for transmission and reception of data.

A unit of a sensing operation performed by the coordinating terminal for signaling of the resource coordination information may be a unit of a subchannel for data transmission/reception, not a unit of a subchannel for signaling the resource coordination information. The resource coordination information may be signaled in units of the subchannel #2, and the sensing operation performed by the coordinating terminal for transmission of the resource coordination information may be performed in units of the subchannel #1. In the exemplary embodiment shown in FIG. 12, the subchannel #2 may include two subchannels #1. A sensing result in one subchannel #1 among two subchannels #1 may satisfy a resource selection criterion. In this case, some or all of the resources selected according to the sensing result may be used for data transmission/reception. However, when the signaling unit is the subchannel #2, the selected resources may not be used.

Accordingly, the resource coordination information may be signaled in units of the subchannel #2, and a start position of the resource coordination information may be selected in units of the subchannel #1. An overhead by the above-described signaling method may be increased than the signaling overhead when the start position of the resource coordination information is selected in units of the subchannel #2. However, when the above-described signaling method is used, if one subchannel #1 among two subchannels #1 in the subchannel #2 satisfies the resource selection criterion, one subchannel #1 may be signaled. Therefore, resource efficiency may be improved.

Alternatively, not only the size of the subchannel through which the resource coordination information is transmitted, but also the start position of the resource coordination information may be selected in units of the subchannel #2, and an offset may be added to the start position of the subchannel #2. The offset may be preferably set in units of the subchannel #1. For example, in the exemplary embodiment shown in FIG. 12, the subchannel #2 includes two subchannels #1, so an offset having a size of 1 bit may be added, and the value of the offset may indicate 0 or 1.

Alternatively, the resource coordination information may be signaled in form of a bitmap. A subchannel for signaling of the resource coordination information in a slot (e.g., sidelink slot) may be indicated by a bitmap. A subchannel for signaling of the resource coordination information within a certain time period may be indicated by a bitmap for each slot. A two-dimensional bitmap-based signaling operation may be performed for all subchannels in slots (e.g., sidelink slots) within a predetermined time period. When a two-dimensional bitmap scheme is used, signaling overhead may increase, and accurate resource coordination information may be provided.

A sidelink HARQ-ACK feedback function may be used for the resource coordination and/or allocation operation. In a sidelink group performing groupcast communication, a GC transmitting terminal may configure resources for member terminal(s) based on groupcast HARQ-ACK feedback information. When the groupcast HARQ-ACK feedback option 2 is used, each of all member terminals belonging to the groupcast group may transmit HARQ-ACK (e.g., HARQ-ACK feedback information) through an individual PSFCH. The GC transmitting terminal may receive a HARQ-ACK of each of the member terminals belonging to the groupcast group, and may identify a reception environment for each of the member terminals based on the HARQ-ACK. Accordingly, the GC transmitting terminal may perform resource configuration for the member terminals based on the HARQ-ACK feedback information.

Specifically, a channel state of a member terminal reporting ACK may be better than a channel state of a member terminal reporting NACK. A distance between the member terminal reporting ACK and the GC transmitting terminal may be shorter than a distance between the member terminal reporting NACK and the GC transmitting terminal. The GC transmitting terminal may allocate independent resources to adjacent member terminals in order to reduce interference between the adjacent member terminals. The distance between the member terminal reporting NACK and the GC transmitting terminal may be relatively long, and a distance between the member terminals reporting NACK may be relatively close. Accordingly, the GC transmitting terminal may allocate independent resources to member terminals reporting NACK. Since a distance between a set of member terminal(s) reporting ACK and a set of member terminal(s) reporting NACK may be relatively long, interference may not be large even when overlapping resources are configured between the aforementioned sets. The HARQ-ACK feedback information may be used to configure a pair between member terminals in the sidelink group.

The HARQ-ACK feedback information may be used for the resource coordination and/or allocation operation in unicast communication or broadcast communication. When a HARQ-ACK reported by a terminal receiving the resource coordination information is ACK, the existing resource coordination information may be maintained. When the HARQ-ACK reported by the terminal receiving the resource coordination information is NACK, the resource coordination information may be updated. In order to avoid frequent updating of the resource coordination information, it may be configured to update the resource coordination information when NACK is continuously reported. The continuous NACKs may be n consecutive NACKs or consecutive NACKs in a time period d. n may be a natural number. The number n of consecutive NACKs and/or the time period d may be configured by system information, RRC signaling, MAC CE, and/or control information (e.g., DCI, SCI). If ACK occurs while counting the number of NACKs, the number of NACKs or the time period may be initialized. Alternatively, if ACK occurs while counting the number of NACKs, counting of the number of NACKs may be continued without initialization of the number of NACKs, and when the number of counted NACKs is n or more, the resource coordination information may be updated. If ACK occurs while counting the number of NACKs, the measurement during the time period may be continued without initialization of the time period, and when the length of the measured time period is d or more, the resource coordination information may be updated.

The resource coordination information may be updated according to a request of the terminal. When it is determined that the update of the resource coordination information is necessary, the terminal may request transmission of the updated resource coordination information by transmitting a triggering signal to the coordinating terminal. A large power may not be required for a monitoring operation of the triggering signal, and the triggering signal may be reliably received by the coordinating terminal. A channel (e.g., resource) through which the triggering signal is transmitted may be designed to be the same as or similar to a PSFCH. The PSFCH periodicity may be 1, 2, or 4 slots (e.g., logical sidelink (SL) slots). The PSFCH may be repeatedly transmitted in two symbols (e.g., two OFDM symbols) in a slot. Among the two symbols, the first symbol may be used for automatic gain control (AGC) for correctly adjusting a received power level of the PSFCH.

The PSFCH may be transmitted using a frequency resource region configured by system information and/or RRC signaling in corresponding symbols. In the symbol(s) configured for PSFCH transmission, a frequency resource region not used for PSFCH transmission may be used for transmission of the triggering signal. A frequency resource region used for transmission of the triggering signal may be configured through system information and/or RRC signaling (e.g., UE-specific RRC signaling). A transmission resource of the triggering signal within the preconfigured resource region may be implicitly configured based on an ID of the coordinating terminal, an ID of the terminal receiving the resource coordination information, and/or an ID of the terminal transmitting the triggering signal. The terminal transmitting the triggering signal may be a terminal independent from the terminal receiving the resource coordination information.

Alternatively, the transmission resource of the triggering signal may be explicitly configured by system information, RRC signaling, MAC CE, and/or control information (e.g., DCI, SCI). In a PC5-RRC connection establishment procedure between terminals for unicast communication, information on the transmission resource for the triggering signal may be signaled. When the resource coordination information is periodically updated, when the triggering signal is periodically transmitted, when the update of the existing resource coordination information is not required, or when additional resource coordination information is not required, a signal (e.g., keeping signal) instructing to prohibit the update of the resource coordination information may be transmitted separately.

A channel (e.g., resource) through which the keeping signal is transmitted may be designed to be the same as or similar to a PSFCH. When the keeping signal is received, the coordinating terminal may stop updating the resource coordination information. In addition, the coordinating terminal may not transmit the resource coordination information. In this case, signaling overhead and power consumption for updating and transmitting the resource coordination information may be reduced. When both the triggering signal and the keeping signal are used, different cyclic shift values may be applied to the triggering signal and the keeping signal, and the triggering signal and the keeping signal may be transmitted in the same resource region. Specifically, when a cyclic shift=0 of a Zadoff-Chu sequence of length 12 transmitted in a specific resource region is used for transmission of the triggering signal, a cyclic shift=6 may be used for transmission of the keeping signal.

Figure 13:
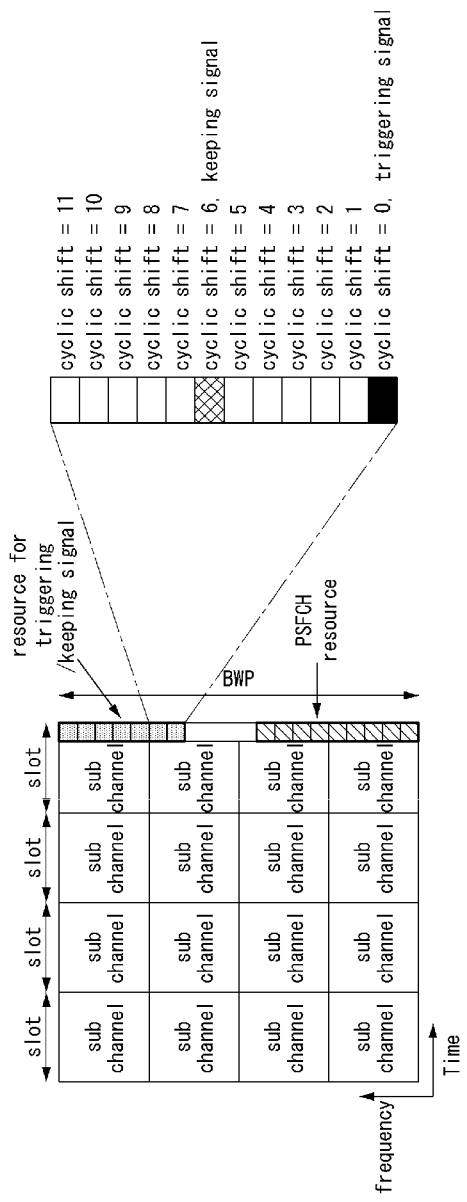
FIG. 13 is a conceptual diagram illustrating a first exemplary embodiment of a resource configuration method for a triggering signal and/or a keeping signal.

FIG. 13 is a conceptual diagram illustrating a first exemplary embodiment of a resource configuration method for a triggering signal and/or a keeping signal.

As shown in FIG. 13, in symbol(s) according to a PSFCH periodicity, a frequency resource region other than a frequency resource region for PSFCH may be configured for transmission of a triggering signal or a keeping signal. The frequency resource region for transmission of a triggering signal or a keeping signal may be configured as a localized region. As another scheme, since resource blocks (RBs) in a bandwidth part (BWP) may be configured by a bitmap, the frequency resource region for transmission of a triggering signal or a keeping signal may be configured by a bitmap.

Alternatively, without separate signaling for resource configuration, a frequency resource region other than a frequency resource region for PSFCH may be configured as the frequency resource region for transmission of a triggering signal or a keeping signal. A triggering signal and/or a keeping signal may be transmitted in RB(s) or RB set(s)

configured as the transmission resource for each of triggering signal and keeping signal by applying different cyclic shift values of the same Zadoff-Chu sequence. In the exemplary embodiment shown in FIG. 13, when a Zadoff-Chu sequence of length 12 is used in one RB, a cyclic shift=0 may be applied to a triggering signal, and a cyclic shift=6 may be applied to a keeping signal. When a signaling unit is an RB set including a plurality of RBs, a Zadoff-Chu sequence having a length corresponding to the RB set may be used. In this case, arbitrary cyclic shift values according to a length corresponding to the RB set, which are other than the cyclic shift=0 or the cyclic shift=6, may be used. The cyclic shift value(s) applied to the triggering signal and/or the keeping signal may be configured by system information, RRC signaling, MAC CE, and/or control information.

When a resource collision between terminals is detected by a third terminal or when a resource collision between terminals is predicted by a third terminal, the third terminal may transmit a collision indicator. The collision indicator may be configured independently of the triggering signal and/or the keeping signal. When the collision indicator is transmitted after a resource collision is detected, a time interval between the time of identifying the resource collision and the time of transmitting the collision indicator may be fixed. Alternatively, the above-described time interval may be pre-configured. For example, the above-described time interval may be configured by system information, RRC signaling, MAC CE, and/or control information.

Terminals including the two terminals in which the resource collision has occurred may detect the collision indicator, and may identify that the resource collision has occurred based on the collision indicator. The resource coordination information may be updated based on the collision indicator. Alternatively, the retransmission of the resource coordination information may be determined based on the collision indicator. When the resource collision is predicted, a resource reselection operation may be performed. A transmission resource of the collision indicator may be configured in the same or similar manner as the transmission resource of the triggering signal and/or the keeping signal. That is, a channel (e.g., resource) through which the collision indicator is transmitted may be designed to be the same as or similar to a PSFCH. The collision indicator may be transmitted to be distinguished from NACK according to the HARQ-ACK feedback scheme.

Specifically, a cyclic shift for the collision indicator may be added in a PSFCH resource in which a HARQ-ACK feedback is transmitted. For example, if a cyclic shift=0 is applied to ACK and a cyclic shift=6 is applied to NACK in a PSFCH resource, a cyclic shift=8 for the collision indicator may be added. That is, a collision indicator to which the cyclic shift=8 is applied may be transmitted. The collision indicator for the resource collision that has already occurred may be transmitted according to a reporting periodicity of NACK (e.g., PSFCH periodicity). Since the collision indicator may be generated faster than NACK, a transmission periodicity of the collision indicator may be shorter than the reporting periodicity of NACK (e.g., PSFCH periodicity). The third terminal may be the coordinating terminal or an arbitrary terminal that has detected the resource collision.

When the collision indicator is received, the coordinating terminal may determine that the resource collision has occurred, may update the resource coordination information, and may transmit the updated resource coordination information. Alternatively, the coordinating terminal may detect or predict the resource collision between terminals without the collision indicator. In this case, the coordinating terminal may update the resource coordination information, and may transmit the updated resource coordination information. Here, the coordinating terminal may determine whether a resource collision has occurred by performing an interference measurement operation and/or a sensing operation. When a collision between a transmission resource of the transmitting terminal and a transmission resource of another terminal is detected or predicted, the coordinating terminal may update the resource coordination information and transmit the updated resource coordination information. The resource coordination information may be updated to prevent the resource collision. Alternatively, the resource coordination information may be automatically updated after a pre-configured time. A timer for automatic update of the resource coordination information may be pre-configured. For example, the timer may be configured by system information, RRC signaling, MAC CE, and/or control information. A timer value may be transmitted through a control channel together with the resource coordination information. After a time according to the timer elapses, the coordinating terminal may transmit the updated resource coordination information.

In the resource coordination information transmission procedure, it may be necessary to set a priority of the resource coordination information. In sidelink communication, priorities of data units may be configured differently. When transmission/reception timings of different data units are the same, a transmission operation or a reception operation on a data unit having a high priority may be performed. For transmission of a data unit having a high priority, a transmission resource of a data unit having a low priority may be pre-empted. In order to avoid a case where a transmission resource of the resource coordination information is pre-empted by transmission of a data unit of another terminal or a case where transmission of the resource coordination information is dropped according to a result of priority comparison with other data units, it may be necessary to set an appropriate priority.

Specifically, the priority may be configured differently according to the type of the resource coordination information. When the resource coordination information is used for sidelink data transmission (e.g., when resources indicated by the resource coordination information are used for data transmission as they are or when resource(s) selected by a resource selection operation within the resources indicated by the resource coordination information are used for data transmission), the priority of the corresponding resource coordination information may be configured to the highest. Accordingly, it may be prevented that the transmission of the corresponding resource coordination information is dropped or that the transmission resource of the corresponding resource coordination information is pre-empted.

Alternatively, a pre-emption operation between data units may be configured, and the configured pre-emption operation may be activated. In this case, the terminal may determine whether the resource is pre-empted by comparing the priorities of the data units. For example, when the priority of data (i.e., data unit) of the terminal is lower than the priority of data of another terminal, the terminal may determine that the transmission resource of the corresponding data is pre-empted. The higher the priority value, the lower the priority of the corresponding data. If the priority value of data to be transmitted by the terminal is $prio_{TX}$, the priority value of data of another terminal is $prio_{RX}$, and '$prio_{TX}$>$prio_{RX}$' is satisfied, the terminal may determine that the transmission resource of the data is pre-empted.

The configured pre-emption operation may not be activated. In this case, when the priority of another terminal data is higher than those of the pre-configured specific priority and the priority of the data to be transmitted by the terminal, the terminal may determine that the transmission resource of the data is pre-empted. That is, when the pre-configured specific priority is $prio_{pre}$, and '$prio_{RX}$<$prio_{pre}$' and '$prio_{TX}$>$prio_{RX}$' are satisfied, the terminal may determine that the transmission resource of the data is pre-empted. Therefore, it may be preferable that the priority for the resource coordination information is configured higher than a pre-emption threshold. For example, it may be preferable that the priority for the resource coordination information is configured to the highest.

In order to select a transmission resource of data, the resource coordination information may be used as a reference. That is, the terminal may not necessarily use the resource coordination information. In this case, in order to prevent a transmission resource of the resource coordination information from being pre-empted, it is not necessary to set the priority of the resource coordination information to the highest priority or a priority higher than the pre-emption threshold. The priority of the resource coordination information may be appropriately set according to an operating environment of the communication system. The resource coordination information may be transmitted through SCI (e.g., $1^{st}$ SCI, $2^{nd}$ SCI, or a new control channel) other than a PSSCH. By applying the above-mentioned priority, the priority of the resource coordination information may be configured to be the same as the priority of the data.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a transmitting terminal in a communication system, the operation method comprising:
   receiving resource coordination information;
   performing a resource sensing operation;
   determining whether an overlapped resource region between a first resource region indicated by the resource coordination information and a second resource region according to a result of the resource sensing operation exists or not;
   in response to determining that the overlapped resource region exists and the overlapped resource region is not selected as a sidelink resource for sidelink communication, selecting a resource within the second resource region as the sidelink resource for the sidelink communication; and
   transmitting data to one or more receiving terminals by using the resource selected within the second resource region,
   wherein the resource coordination information is one of information on a preferred resource and information on a non-preferred resource for the sidelink communication.

2. The operation method according to claim 1, further comprising receiving an indicator indicating that the resource coordination information is the information on the preferred resource or the information on the non-preferred resource.

3. The operation method according to claim 1, further comprising receiving a message including at least one of information on a priority of the resource coordination information and information on a priority of the result of the resource sensing operation.

4. The operation method according to claim 1, wherein a maximum number of resource regions indicated by the resource coordination information is three or more.

5. The operation method according to claim 1, wherein a size of a subchannel indicated by the resource coordination information is configured to be different from a size of a subchannel through which the data is transmitted and received.

6. The operation method according to claim 1, wherein a resource pool indicated by the resource coordination information is independently configured, and the resource coordination information is received in the resource pool.

7. The operation method according to claim 1, wherein the resource coordination information has a high priority so that a transmission resource of the resource coordination information is not pre-empted.

8. The operation method according to claim 1, further comprising periodically receiving updated resource coordination information.

9. The operation method according to claim 1, further comprising receiving updated resource coordination information according to an occurrence of an event or an update request.

10. A transmitting terminal, the transmitting terminal comprising:
    a processor;
    a memory electronically communicating with the processor; and
    instructions stored in the memory, wherein when executed by the processor, the instructions cause the transmitting terminal to:
    receive resource coordination information;
    perform a resource sensing operation;
    determine whether an overlapped resource region between a first resource region indicated by the resource coordination information and a second resource region according to a result of the resource sensing operation exists or not;
    in response to determining that the overlapped resource region exists and the overlapped resource region is not selected as a sidelink resource for sidelink communication, select a resource within the second resource region as the sidelink resource for the sidelink communication; and
    transmit data to one or more receiving terminals by using the resource selected within the second resource region, wherein the resource coordination information is one of information on a preferred resource and information on a non-preferred resource for the sidelink communication.

11. The transmitting terminal according to claim 10, wherein the instructions further cause the transmitting terminal to receive an indicator indicating that the resource coordination information is the information on the preferred resource or the information on the non-preferred resource.

12. The transmitting terminal according to claim 10, wherein a maximum number of resource regions indicated by the resource coordination information is three or more, and a size of a subchannel indicated by the resource coordination information is configured to be different from a size of a subchannel through which the data is transmitted and received.

13. The operation method according to claim 1, wherein, in response to determining that the overlapped resource region exists and the overlapped resource region is selected as the sidelink resource for the sidelink communication, the data is transmitted to the one or more receiving terminals by using a resource selected from the overlapped resource region.

14. The operation method according to claim 1, wherein, in response to determining that the resource coordination information is the information on the preferred resource, the first resource region indicated by the resource coordination information is considered for selecting the sidelink resource, and in response to determining that the resource coordination information is the information on the non-preferred resource, a resource other than the first resource region indicated by the resource coordination information is considered for selecting the sidelink resource.

15. The transmitting terminal according to claim 10, wherein, in response to determining that the overlapped resource region exists and the overlapped resource region is selected as the sidelink resource for the sidelink communication, the data is transmitted to the one or more receiving terminals by using a resource selected from the overlapped resource region.

16. The transmitting terminal according to claim 10, wherein, in response to determining that the resource coordination information is the information on the preferred resource, the first resource region indicated by the resource coordination information is considered for selecting the sidelink resource, and in response to determining that the resource coordination information is the information on the non-preferred resource, a resource other than the first resource region indicated by the resource coordination information is considered for selecting the sidelink resource.

\* \* \* \* \*